United States Patent
Mitani et al.

(10) Patent No.: US 12,132,349 B2
(45) Date of Patent: Oct. 29, 2024

(54) POWER SUPPLY CIRCUIT OF MOVING OBJECT

(71) Applicant: HONDA MOTOR CO., LTD., Tokyo (JP)

(72) Inventors: Manabu Mitani, Wako (JP); Sadao Shinohara, Wako (JP); Masataka Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 4 days.

(21) Appl. No.: 18/165,974

(22) Filed: Feb. 8, 2023

(65) Prior Publication Data

US 2023/0253820 A1 Aug. 10, 2023

(30) Foreign Application Priority Data

Feb. 10, 2022 (JP) .................................. 2022-019192
Dec. 27, 2022 (JP) .................................. 2022-209556

(51) Int. Cl.
| | |
|---|---|
| *B60L 3/04* | (2006.01) |
| *B60L 50/60* | (2019.01) |
| *B60L 58/18* | (2019.01) |
| *B64D 27/24* | (2006.01) |
| *H02J 9/06* | (2006.01) |

(52) U.S. Cl.
CPC ............... *H02J 9/068* (2020.01); *B60L 3/04* (2013.01); *B60L 50/60* (2019.02); *B60L 58/18* (2019.02); *B64D 27/24* (2013.01); *H02J 9/061* (2013.01); *B60L 2200/10* (2013.01); *H02J 2310/44* (2020.01)

(58) Field of Classification Search
CPC .......... B60L 3/0092; B60L 3/04; B60L 50/60; B60L 58/18; B60L 58/21; B60L 2200/10; B64D 2221/00; H02J 9/04; H02J 9/06; H02J 9/061; H02J 9/062; H02J 9/068; H02J 2310/44
See application file for complete search history.

(56) References Cited

U.S. PATENT DOCUMENTS

| | | | |
|---|---|---|---|
| 8,307,934 B2 * | 11/2012 | Rini | A62C 3/07 180/271 |
| 10,689,129 B1 * | 6/2020 | Nehmeh | B64D 47/00 |
| 11,919,420 B2 * | 3/2024 | Morita | B60L 50/64 |
| 2020/0180454 A1 | 6/2020 | Gao et al. | |
| 2020/0313457 A1 * | 10/2020 | Kozuki | H02J 7/0047 |

\* cited by examiner

*Primary Examiner* — Levi Gannon

(74) *Attorney, Agent, or Firm* — Rankin, Hill & Clark LLP

(57) ABSTRACT

A power supply circuit of an aircraft includes: a first power transmission path for transmitting electric power from each of a first main power source device and a second main power source device to a first load device and a second load device; a first current sensor; a second current sensor; a third current sensor; and a fourth current sensor, and determines whether an abnormality has occurred based on currents detected by the first current sensor, the second current sensor, the third current sensor and the fourth current sensor.

7 Claims, 9 Drawing Sheets

POWER SUPPLY CIRCUIT OF MOVING OBJECT

CROSS-REFERENCE TO RELATED APPLICATIONS

This application is based upon and claims the benefit of priority from Japanese Patent Applications No. 2022-019192 filed on Feb. 10, 2022, and No. 2022-209556 filed on Dec. 27, 2022, the contents of which are incorporated herein by reference.

BACKGROUND OF THE INVENTION

Field of the Invention

The present invention relates to a power supply circuit of a moving object.

Description of the Related Art

US 2020/0180454 A1 discloses a power supply circuit of an aircraft, which is a moving object. In the power supply circuit, a plurality of power sources and a plurality of loads are connected to a common power transmission bus. A contactor unit is provided between each power source and the power transmission bus. A contactor unit is provided between each load and the power transmission bus.

SUMMARY OF THE INVENTION

In the power supply circuit of the moving object disclosed in US 2020/0180454 A1, when an abnormality such as a short circuit occurs in the power supply circuit, electric power can be supplied to at least some of the loads by setting the contactor unit to the interruption state in accordance with a location where the abnormality has occurred. However, in the power supply circuit of the moving object disclosed in US 2020/0180454 A1, there is no disclosure of a technique for specifying a location where an abnormality has occurred. Therefore, in the power supply circuit of the moving object disclosed in US 2020/0180454 A1, there is a problem in that a location where the abnormality has occurred cannot be specified.

An object of the present invention is to solve the above-mentioned problem.

According to an aspect of the present invention, there is provided a power supply circuit of a moving object, the power supply circuit comprising: a first power transmission path configured to transmit electric power from one first power source and at least one second power source to one first load and at least one second load; a first contactor unit configured to switch between a conduction state in which electricity flows and an interruption state in which flow of electricity is interrupted, between the first power source and the first power transmission path; at least one second contactor unit configured to switch between the conduction state and the interruption state, between the at least one second power source and the first power transmission path; a third contactor unit configured to switch between the conduction state and the interruption state, between the first load and the first power transmission path; at least one fourth contactor unit configured to switch between the conduction state and the interruption state, between the at least one second load and the first power transmission path; a first current sensor configured to detect a current between the first contactor unit and the first power transmission path; at least one second current sensor configured to detect a current between the at least one second contactor unit and the first power transmission path; a third current sensor configured to detect a current between the third contactor unit and the first power transmission path; and at least one fourth current sensor configured to detect a current between the at least one fourth contactor unit and the first power transmission path, wherein when the first contactor unit, the at least one second contactor unit, the third contactor unit, and the at least one fourth contactor unit are in the conduction state, determination is made as to whether or not an abnormality has occurred in the first power transmission path, whether or not an abnormality has occurred between the first power source and the first contactor unit, and whether or not an abnormality has occurred between the first load and the third contactor unit, based on the current detected by each of the first current sensor, the at least one second current sensor, the third current sensor, and the at least one fourth current sensor.

According to the present invention, it is possible to specify a location where an abnormality has occurred in the power supply circuit of the moving object.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

Figure 1:
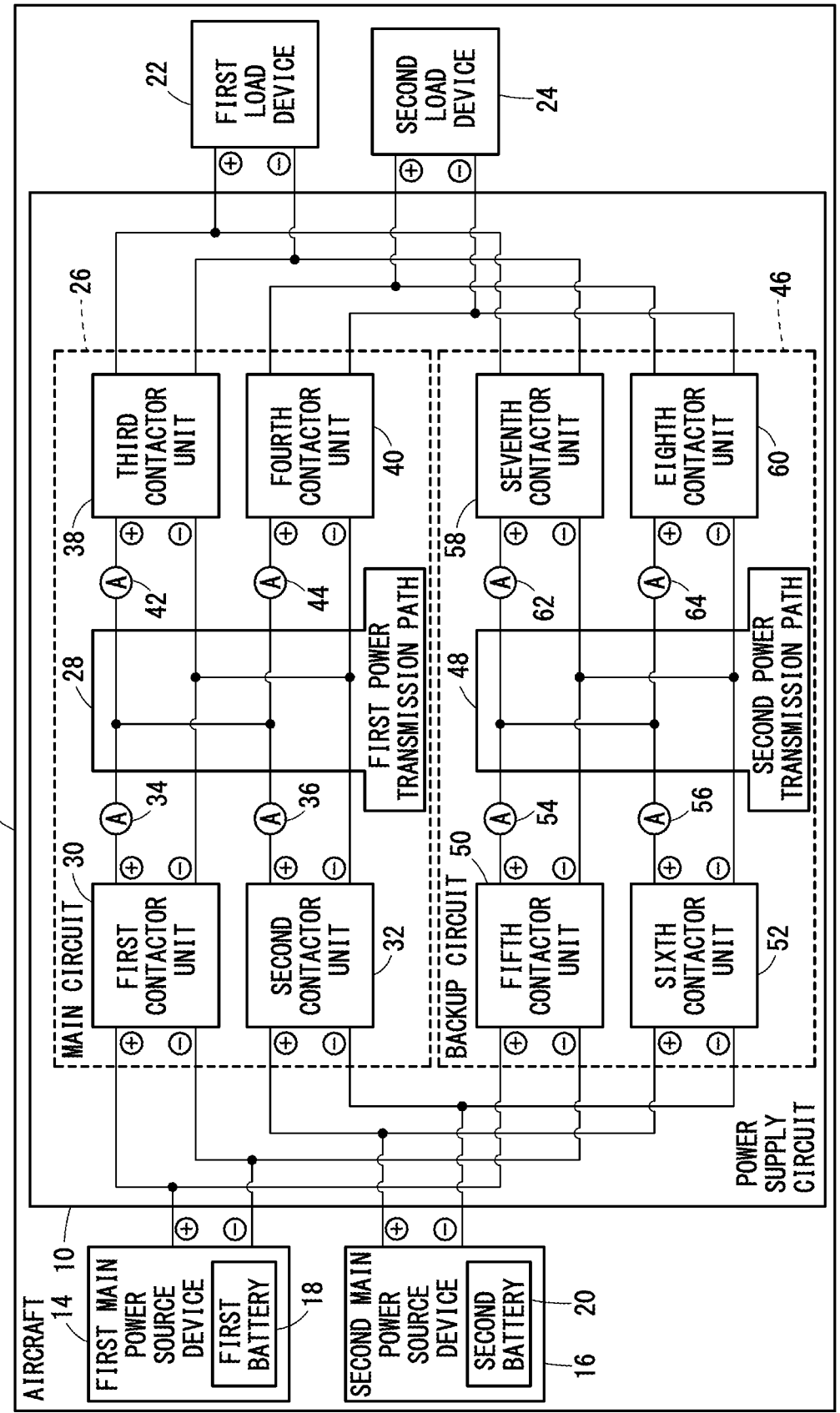
FIG. 1 is a circuit diagram of a power supply circuit.

FIG. 1 is a circuit diagram of a power supply circuit 10. The power supply circuit 10 is mounted on an aircraft 12. The aircraft 12 corresponds to a moving object of the present invention. The aircraft 12 includes a first main power source device 14 and a second main power source device 16.

The first main power source device 14 includes a first battery 18. The first main power source device 14 may include a capacitor instead of the first battery 18. The first main power source device 14 may include a generator instead of the first battery 18. The first main power source device 14 may include elements such as a sensor, a fuse, a breaker, a diode, a transistor, a resistor, a coil, and a capacitor. Further, the first main power source device 14 may include an inverter, a converter, and the like.

The second main power source device 16 includes a second battery 20. The second main power source device 16 may include a capacitor instead of the second battery 20. The second main power source device 16 may include a generator instead of the second battery 20. The second main power source device 16 may include elements such as a sensor, a fuse, a breaker, a diode, a transistor, a resistor, a coil, and a capacitor. Further, the second main power source device 16 may include an inverter, a converter, and the like.

The aircraft 12 includes a first load device 22 and a second load device 24. The first load device 22 is, for example, a vertical thruster that generates a propulsive force in a vertical direction for the aircraft 12. The second load device 24 is, for example, a horizontal thruster that generates a propulsive force in a horizontal direction for the aircraft 12. Each of the first load device 22 and the second load device 24 is driven by electric power supplied from the first main power source device 14 and the second main power source device 16.

The first load device 22 may include an inverter, a converter, a resistor, or the like. In the first load device 22, a plurality of inverters, converters, resistors, and the like may be connected in parallel. The first load device 22 may include a battery or a capacitor as an auxiliary power source.

The second load device 24 may include an inverter, a converter, a resistor, or the like. In the second load device 24, a plurality of inverters, converters, resistors, and the like may be connected in parallel. The second load device 24 may include a battery or a capacitor as an auxiliary power source.

The power supply circuit 10 includes a main circuit 26. The main circuit 26 includes a first power transmission path 28. The first power transmission path 28 is configured to transmit electric power from each of the first main power source device 14 and the second main power source device 16 to the first load device 22 and the second load device 24.

The main circuit 26 includes a first contactor unit 30 and a second contactor unit 32. The first contactor unit 30 includes a contactor (not shown) on the positive line of the main circuit 26, and includes a contactor (not shown) on the negative line of the main circuit 26. The second contactor unit 32 includes a contactor (not shown) on the positive line of the main circuit 26, and includes a contactor (not shown) on the negative line of the main circuit 26.

Between the first main power source device 14 and the first power transmission path 28, the first contactor unit 30 switches between a conduction state in which electricity flows and an interruption state in which the flow of electricity is interrupted. Between the second main power source device 16 and the first power transmission path 28, the second contactor unit 32 switches between a conduction state in which electricity flows and an interruption state in which the flow of electricity is interrupted.

The main circuit 26 includes a first current sensor 34 and a second current sensor 36. The first current sensor 34 is provided on the positive line between the first contactor unit 30 and the first power transmission path 28. The first current sensor 34 detects a current between the first contactor unit 30 and the first power transmission path 28. The second current sensor 36 is provided on the positive line between the second contactor unit 32 and the first power transmission path 28. The second current sensor 36 detects a current between the second contactor unit 32 and the first power transmission path 28.

The main circuit 26 includes a third contactor unit 38 and a fourth contactor unit 40. The third contactor unit 38 includes a contactor (not shown) on the positive line of the main circuit 26, and includes a contactor (not shown) on the negative line of the main circuit 26. The fourth contactor unit 40 includes a contactor (not shown) on the positive line of the main circuit 26, and includes a contactor (not shown) on the negative line of the main circuit 26.

Between the first load device 22 and the first power transmission path 28, the third contactor unit 38 switches between a conduction state in which electricity flows and an interruption state in which the flow of electricity is interrupted. Between the second load device 24 and the first power transmission path 28, the fourth contactor unit 40 switches between a conduction state in which electricity flows and an interruption state in which the flow of electricity is interrupted.

The main circuit 26 includes a third current sensor 42 and a fourth current sensor 44. The third current sensor 42 is provided on the positive line between the third contactor unit 38 and the first power transmission path 28. The third current sensor 42 detects a current between the third contactor unit 38 and the first power transmission path 28. The fourth current sensor 44 is provided on the positive line between the fourth contactor unit 40 and the first power transmission path 28. The fourth current sensor 44 detects a current between the fourth contactor unit 40 and the first power transmission path 28.

The main circuit 26 may include elements such as a sensor, a fuse, a breaker, a diode, a transistor, a resistor, a coil, and a capacitor.

The power supply circuit 10 includes a backup circuit 46. The backup circuit 46 includes a second power transmission path 48. The second power transmission path 48 is configured to transmit electric power from each of the first main power source device 14 and the second main power source device 16 to the first load device 22 and the second load device 24.

The backup circuit 46 includes a fifth contactor unit 50 and a sixth contactor unit 52. The fifth contactor unit 50 includes a contactor (not shown) on the positive line of the backup circuit 46, and includes a contactor (not shown) on the negative line of the backup circuit 46. The sixth contactor unit 52 includes a contactor (not shown) on the positive line of the backup circuit 46, and includes a contactor (not shown) on the negative line of the backup circuit 46.

Between the first main power source device 14 and the second power transmission path 48, the fifth contactor unit 50 switches between a conduction state in which electricity flows and an interruption state in which the flow of electricity is interrupted. Between the second main power source device 16 and the second power transmission path 48, the sixth contactor unit 52 switches between a conduction state in which electricity flows and an interruption state in which the flow of electricity is interrupted.

The backup circuit 46 includes a fifth current sensor 54 and a sixth current sensor 56. The fifth current sensor 54 is provided on the positive line between the fifth contactor unit 50 and the second power transmission path 48. The fifth current sensor 54 detects a current between the fifth contactor unit 50 and the second power transmission path 48. The sixth current sensor 56 is provided on the positive line between the sixth contactor unit 52 and the second power transmission path 48. The sixth current sensor 56 detects a current between the sixth contactor unit 52 and the second power transmission path 48.

The backup circuit 46 includes a seventh contactor unit 58 and an eighth contactor unit 60. The seventh contactor unit 58 includes a contactor (not shown) on the positive line of the backup circuit 46, and includes a contactor (not shown) on the negative line of the backup circuit 46. The eighth contactor unit 60 includes a contactor (not shown) on the positive line of the backup circuit 46, and includes a contactor (not shown) on the negative line of the backup circuit 46.

Between the first load device 22 and the second power transmission path 48, the seventh contactor unit 58 switches between a conduction state in which electricity flows and an interruption state in which the flow of electricity is interrupted. Between the second load device 24 and the second power transmission path 48, the eighth contactor unit 60 switches between a conduction state in which electricity flows and an interruption state in which the flow of electricity is interrupted.

The backup circuit 46 includes a seventh current sensor 62 and an eighth current sensor 64. The seventh current sensor 62 is provided on the positive line between the seventh contactor unit 58 and the second power transmission path 48. The seventh current sensor 62 detects a current between the seventh contactor unit 58 and the second power transmission path 48. The eighth current sensor 64 is provided on the positive line between the eighth contactor unit 60 and the second power transmission path 48. The eighth current sensor 64 detects a current between the eighth contactor unit 60 and the second power transmission path 48.

The backup circuit 46 may include elements such as a sensor, a fuse, a breaker, a diode, a transistor, a resistor, a coil, and a capacitor.

Figure 2:
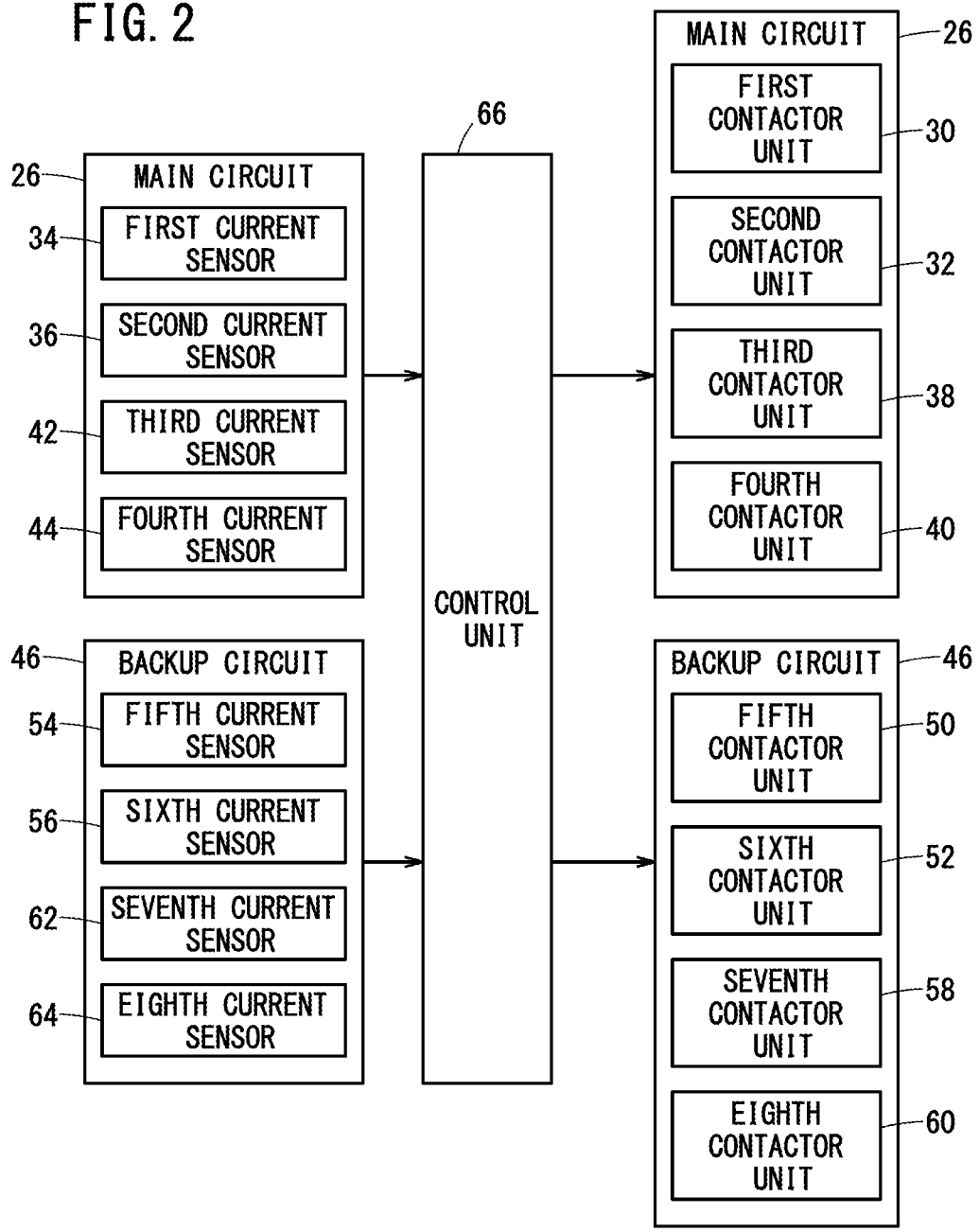
FIG. 2 is a control block diagram of the power supply circuit.

FIG. 2 is a control block diagram of the power supply circuit 10. The power supply circuit 10 includes a control unit 66.

Information about the current detected by each of the first current sensor 34, the second current sensor 36, the third current sensor 42, and the fourth current sensor 44 of the main circuit 26 is input to the control unit 66. Information about the current detected by each of the fifth current sensor 54, the sixth current sensor 56, the seventh current sensor 62, and the eighth current sensor 64 of the backup circuit 46 is input to the control unit 66.

The control unit 66 controls each of the first contactor unit 30, the second contactor unit 32, the third contactor unit 38, and the fourth contactor unit 40 of the main circuit 26. Thus, the control unit 66 brings each of the first contactor unit 30, the second contactor unit 32, the third contactor unit 38, and the fourth contactor unit 40 of the main circuit 26 into the conduction state or the interruption state. The control unit 66 controls each of the fifth contactor unit 50, the sixth contactor unit 52, the seventh contactor unit 58, and the eighth contactor unit 60 of the backup circuit 46. Thus, the control unit 66 brings each of the fifth contactor unit 50, the sixth contactor unit 52, the seventh contactor unit 58, and the eighth contactor unit 60 of the backup circuit 46 into the conduction state or the interruption state.

The control unit 66 is realized by processing circuitry. The processing circuitry can be configured by an integrated circuit such as an application specific integrated circuit (ASIC) or a field-programmable gate array (FPGA). Further, the processing circuitry may be configured by an electronic circuit including a discrete device. The processing circuitry may be configured by a processor such as a central processing unit (CPU) or a graphics processing unit (GPU). In this case, the processing circuitry is realized by the processor executing programs stored in a storage unit (not shown).

[Power Supply Path During Normal Time]

Figure 3:
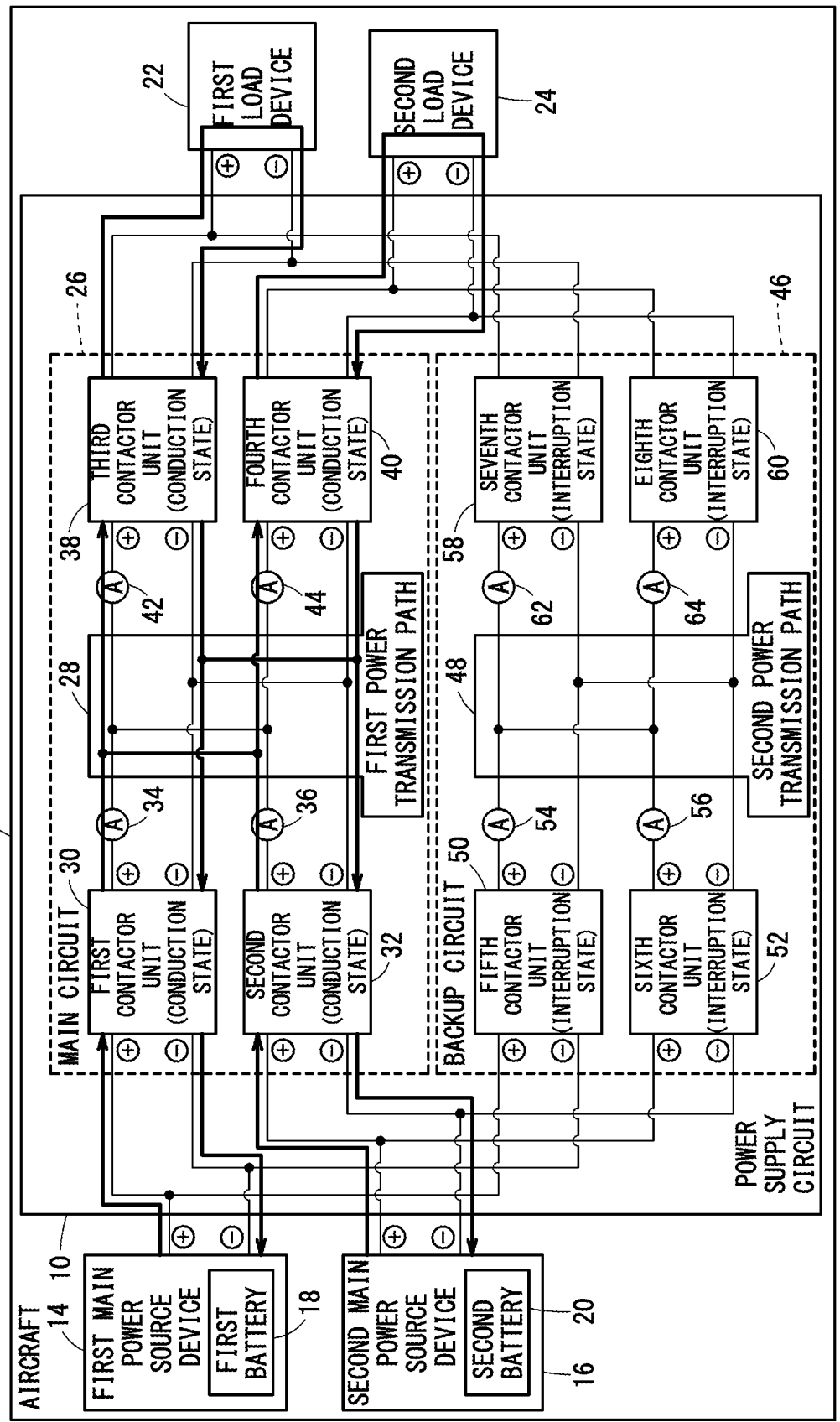
FIG. 3 is a diagram showing the flow of current in the power supply circuit.

Next, the flow of current in the power supply circuit 10 when each of the first load device 22 and the second load device 24 is driven will be described. FIG. 3 is a diagram showing the flow of current in the power supply circuit 10. In FIG. 3, thick arrows indicate the flow of current in the power supply circuit 10.

When each of the first load device 22 and the second load device 24 is driven, the control unit 66 brings the first contactor unit 30, the second contactor unit 32, the third contactor unit 38, and the fourth contactor unit 40 of the main circuit 26 into the conduction state. Further, the control unit 66 brings the fifth contactor unit 50, the sixth contactor unit 52, the seventh contactor unit 58, and the eighth contactor unit 60 of the backup circuit 46 into the interruption state.

As a result, the electric power output from each of the first main power source device 14 and the second main power source device 16 is supplied to the first load device 22 and the second load device 24 via the first power transmission path 28. Each of the first load device 22 and the second load device 24 is driven by the electric power supplied from the first main power source device 14 and the second main power source device 16.

In this case, the magnitude of the current detected by each of the first current sensor 34, the second current sensor 36, the third current sensor 42, and the fourth current sensor 44 is less than a predetermined value. The predetermined value is a value set for determining whether an overcurrent is flowing in the power supply circuit 10. The direction of the current detected by each of the first current sensor 34, the second current sensor 36, the third current sensor 42, and the fourth current sensor 44 in the following case is defined as a positive direction, and the direction of the current opposite to the positive direction is defined as the negative direction. This case is a case where electric power is supplied from each of the first main power source device 14 and the second main power source device 16 to the first load device 22 and the second load device 24 via the first power transmission path 28, when a short circuit does not occur in the power supply circuit 10.

[Power Supply Path when Circuit Failure Occurs on Main Power Source Device Side]

Figure 4:
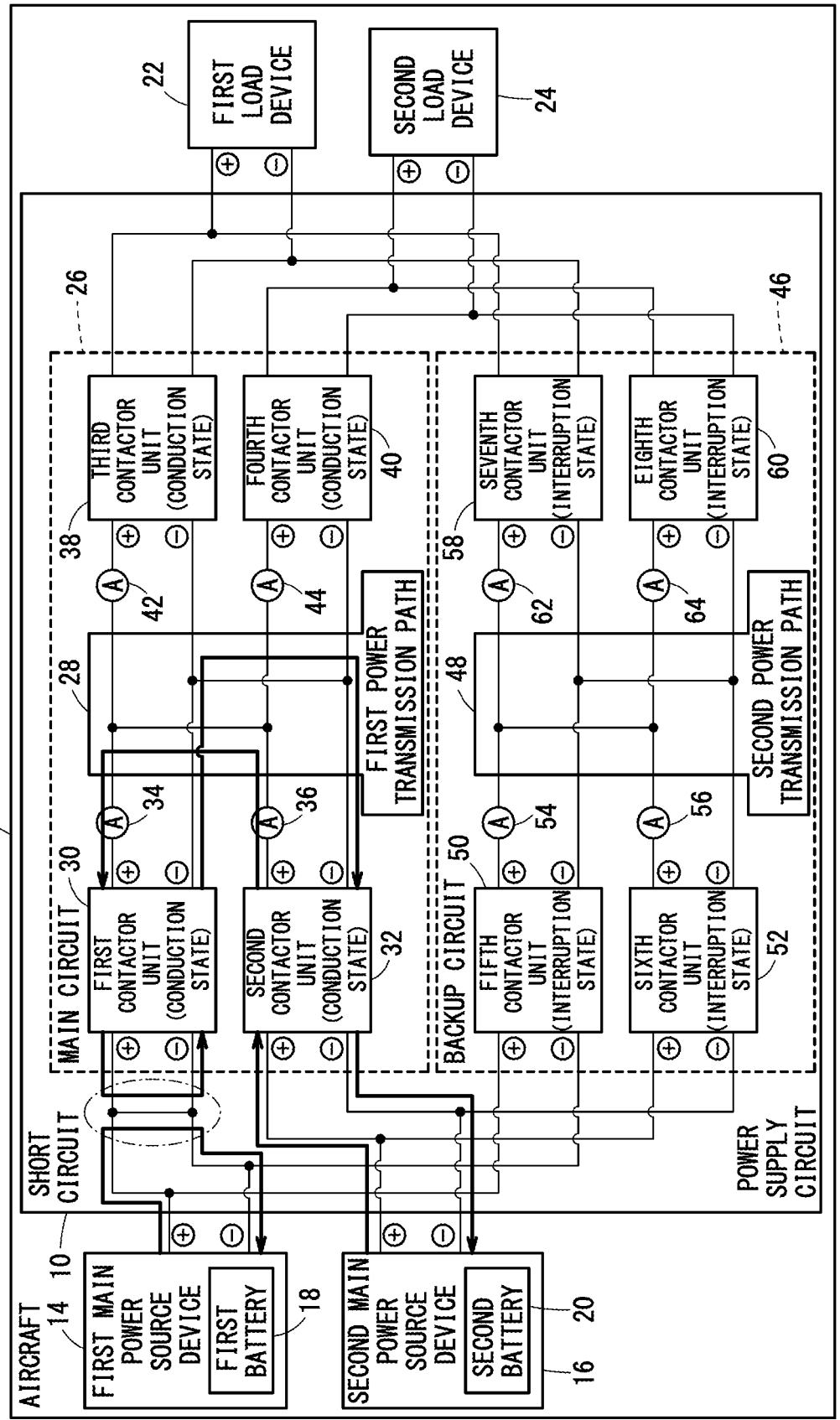
FIG. 4 is a diagram showing the flow of current in the power supply circuit.

Next, the flow of current in the power supply circuit 10 when a short circuit has occurred between the first main power source device 14 and the first contactor unit 30 will be described. FIG. 4 is a diagram showing the flow of current in the power supply circuit 10. In FIG. 4, thick arrows indicate the flow of current in the power supply circuit 10.

As shown in FIG. 4, when a short circuit has occurred between the first main power source device 14 and the first contactor unit 30, the magnitude of the current detected by each of the first current sensor 34 and the second current sensor 36 is equal to or greater than the predetermined value. Further, the direction of the current detected by the first current sensor 34 is the negative direction. Furthermore, the direction of the current detected by the second current sensor 36 is the positive direction.

The magnitude of the current detected by each of the third current sensor 42 and the fourth current sensor 44 is extremely small. That is, the magnitude of the current detected by each of the third current sensor 42 and the fourth current sensor 44 is less than the predetermined value.

When all of the following conditions are satisfied, the control unit 66 determines that a short circuit has occurred between the first main power source device 14 and the first contactor unit 30.

The conditions are the following six conditions: the first contactor unit 30, the second contactor unit 32, the third contactor unit 38, and the fourth contactor unit 40 of the main circuit 26 are in the conduction state; the fifth contactor unit 50, the sixth contactor unit 52, the seventh contactor unit 58, and the eighth contactor unit 60 of the backup circuit 46 are in the interruption state; the magnitude of the current detected by the first current sensor 34 is equal to or greater than the predetermined value, and the direction of the current is the negative direction; the magnitude of the current detected by the second current sensor 36 is equal to or greater than the predetermined value, and the direction of the current is the positive direction; the magnitude of the current detected by the third current sensor 42 is less than the predetermined value; and the magnitude of the current detected by the fourth current sensor 44 is less than the predetermined value.

Figure 5:
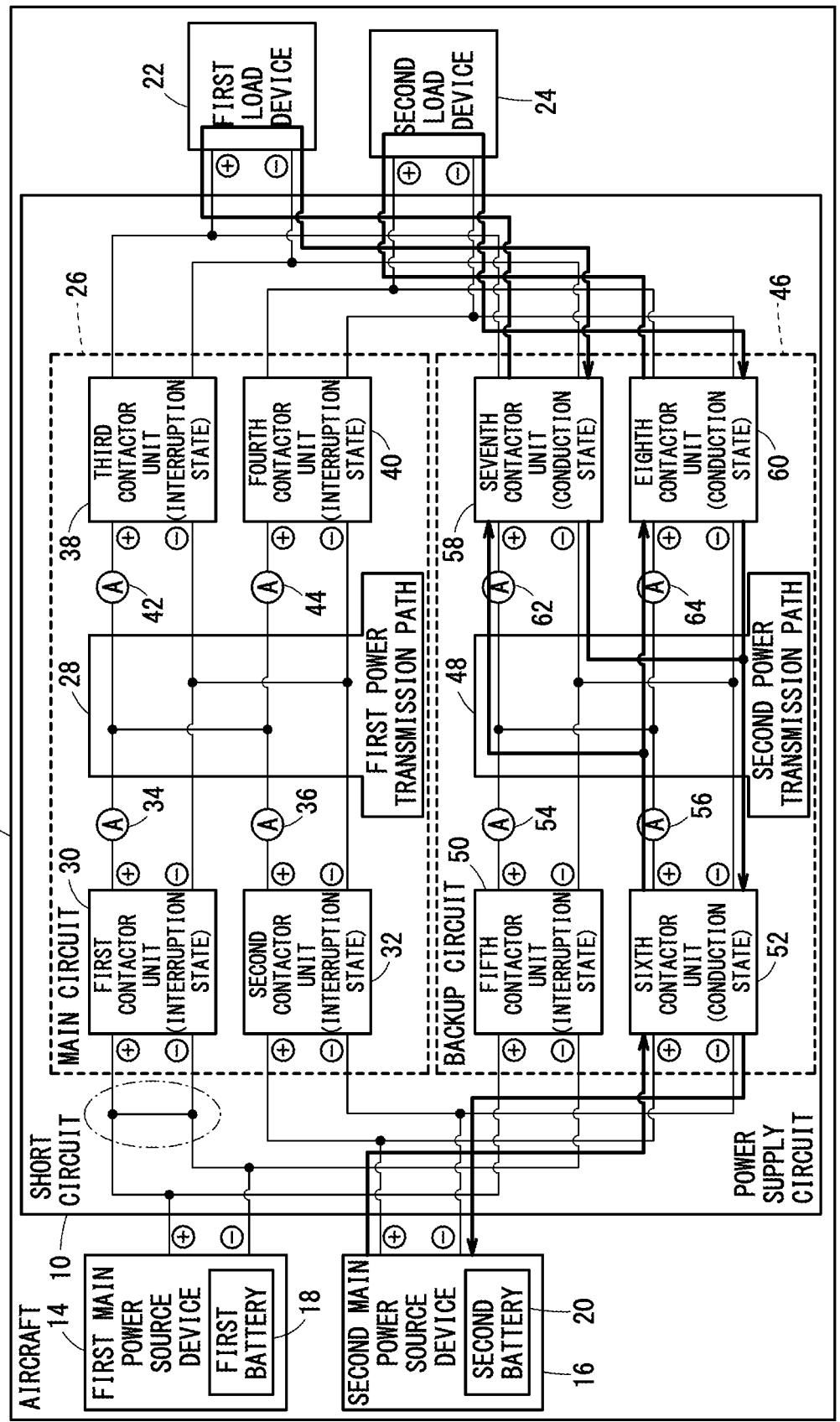
FIG. 5 is a diagram showing the flow of current in the power supply circuit.

FIG. 5 is a diagram showing the flow of current in the power supply circuit 10. In FIG. 5, thick arrows indicate the flow of current in the power supply circuit 10.

When it is determined that a short circuit has occurred between the first main power source device 14 and the first contactor unit 30, the control unit 66 performs control as follows. As shown in FIG. 5, the control unit 66 brings the first contactor unit 30, the second contactor unit 32, the third contactor unit 38, and the fourth contactor unit 40 of the main circuit 26 and the fifth contactor unit 50 of the backup circuit 46 into the interruption state. Further, the control unit 66 brings the sixth contactor unit 52, the seventh contactor unit 58, and the eighth contactor unit 60 of the backup circuit 46 into the conduction state.

Since the first main power source device 14 is directly connected to the location where the short circuit has occurred, it is impossible to prevent an overcurrent from flowing into the first main power source device 14. On the other hand, since the fifth contactor unit 50 is in the interruption state, the second main power source device 16 is disconnected from the location where the short circuit has occurred. The electric power output from the second main power source device 16 is supplied to the first load device 22 and the second load device 24 via the second power transmission path 48. Each of the first load device 22 and the second load device 24 is driven by the electric power supplied from the second main power source device 16.

[Power Supply Path when Failure Occurs in First Power Transmission Path]

Figure 6:
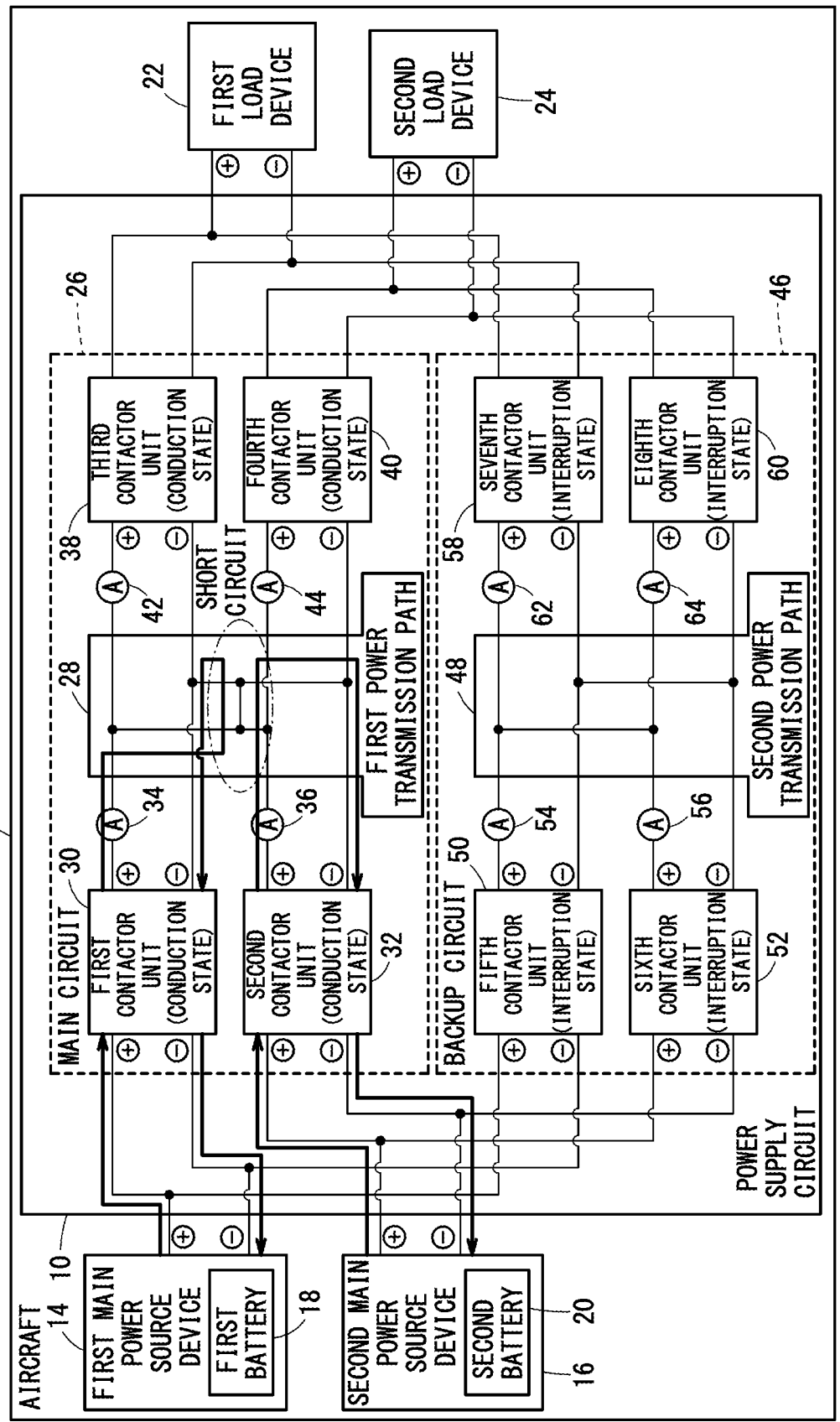
FIG. 6 is a diagram showing the flow of current in the power supply circuit.

Next, the flow of current in the power supply circuit 10 when a short circuit has occurred in the first power transmission path 28 will be described. FIG. 6 is a diagram showing the flow of current in the power supply circuit 10. In FIG. 6, thick arrows indicate the flow of current in the power supply circuit 10.

As shown in FIG. 6, when a short circuit has occurred in the first power transmission path 28, the magnitude of the current detected by each of the first current sensor 34 and the second current sensor 36 is equal to or greater than the predetermined value. Further, the direction of the current detected by each of the first current sensor 34 and the second current sensor 36 is the positive direction.

The magnitude of the current detected by each of the third current sensor 42 and the fourth current sensor 44 is extremely small. That is, the magnitude of the current detected by each of the third current sensor 42 and the fourth current sensor 44 is less than the predetermined value.

When all of the following conditions are satisfied, the control unit 66 determines that a short circuit has occurred in the first power transmission path 28.

The conditions are the following six conditions: the first contactor unit 30, the second contactor unit 32, the third contactor unit 38, and the fourth contactor unit 40 of the main circuit 26 are in the conduction state; the fifth contactor unit 50, the sixth contactor unit 52, the seventh contactor unit 58, and the eighth contactor unit 60 of the backup circuit 46 are in the interruption state; the magnitude of the current detected by the first current sensor 34 is equal to or greater than the predetermined value, and the direction of the current is the positive direction; the magnitude of the current detected by the second current sensor 36 is equal to or greater than the predetermined value, and the direction of the current is the positive direction; the magnitude of the current detected by the third current sensor 42 is less than the predetermined value; and the magnitude of the current detected by the fourth current sensor 44 is less than the predetermined value.

Figure 7:
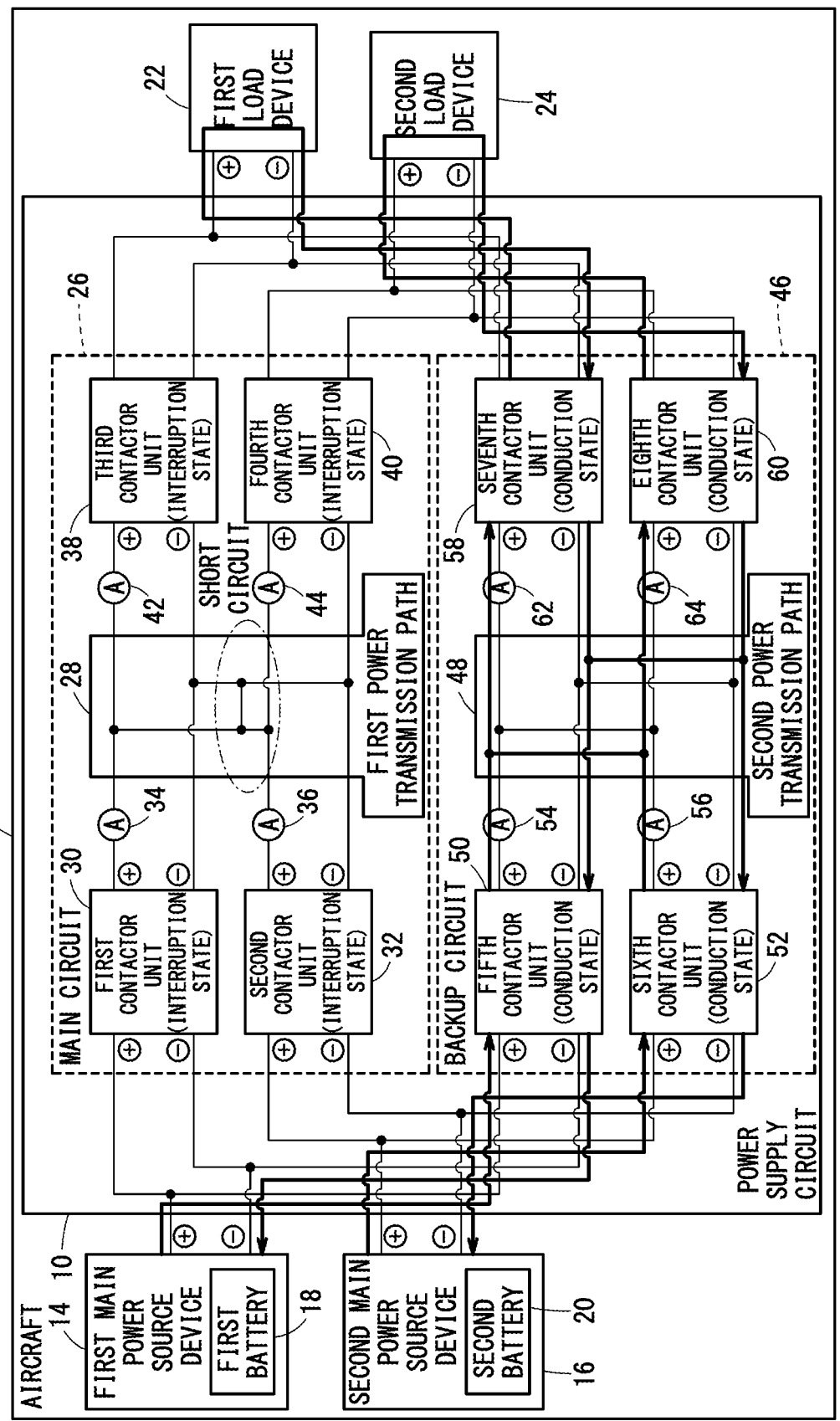
FIG. 7 is a diagram showing the flow of current in the power supply circuit.

FIG. 7 is a diagram showing the flow of current in the power supply circuit 10. In FIG. 7, thick arrows indicate the flow of current in the power supply circuit 10.

When it is determined that a short circuit has occurred in the first power transmission path 28, the control unit 66 performs control as follows. As shown in FIG. 7, the control unit 66 brings the first contactor unit 30, the second contactor unit 32, the third contactor unit 38, and the fourth contactor unit 40 of the main circuit 26 into the interruption state. Further, the control unit 66 brings the fifth contactor unit 50, the sixth contactor unit 52, the seventh contactor unit 58, and the eighth contactor unit 60 of the backup circuit 46 into the conduction state.

As a result, the first main power source device 14 and the second main power source device 16 can be disconnected from the location where the short circuit has occurred. The electric power output from each of the first main power source device 14 and the second main power source device 16 is supplied to the first load device 22 and the second load device 24 via the second power transmission path 48. Each of the first load device 22 and the second load device 24 is driven by the electric power supplied from the first main power source device 14 and the second main power source device 16.

[Power Supply Path when Circuit Failure Occurs on Load Device Side]

Figure 8:
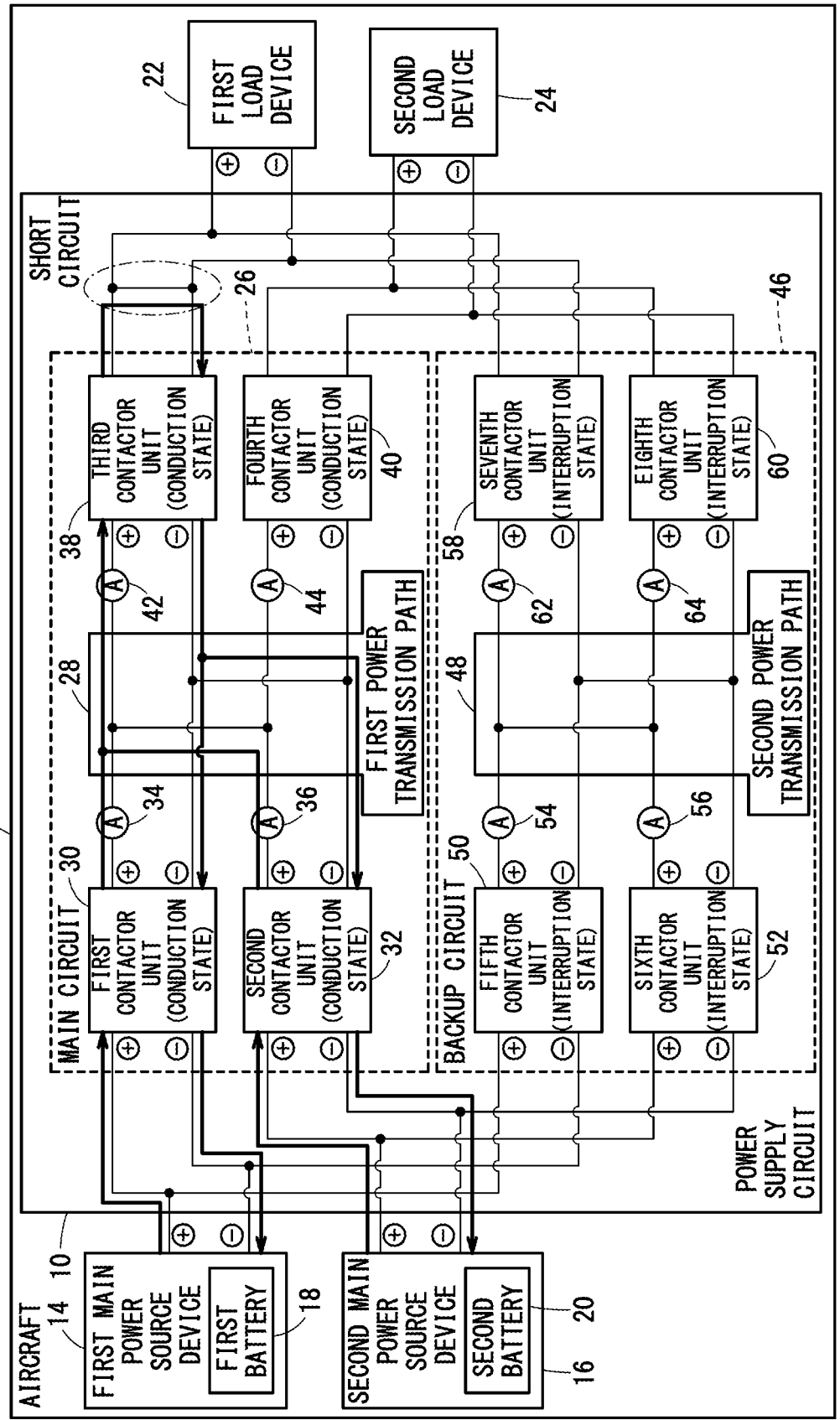
FIG. 8 is a diagram showing the flow of current in the power supply circuit.

Next, the flow of current in the power supply circuit 10 when a short circuit has occurred between the first load device 22 and the third contactor unit 38 will be described. FIG. 8 is a diagram showing the flow of current in the power supply circuit 10. In FIG. 8, thick arrows indicate the flow of current in the power supply circuit 10.

As shown in FIG. 8, when a short circuit has occurred between the first load device 22 and the third contactor unit 38, the magnitude of the current detected by each of the first current sensor 34, the second current sensor 36, and the third current sensor 42 is equal to or greater than the predetermined value. Further, the direction of the current detected by each of the first current sensor 34, the second current sensor 36, and the third current sensor 42 is the positive direction.

The magnitude of the current detected by the fourth current sensor 44 is extremely small. That is, the magnitude of the current detected by the fourth current sensor 44 is less than the predetermined value.

When all of the following conditions are satisfied, the control unit 66 determines that a short circuit has occurred between the first load device 22 and the third contactor unit 38.

The conditions are the following six conditions: the first contactor unit 30, the second contactor unit 32, the third contactor unit 38, and the fourth contactor unit 40 of the main circuit 26 are in the conduction state; the fifth contactor unit 50, the sixth contactor unit 52, the seventh contactor unit 58, and the eighth contactor unit 60 of the backup circuit 46 are in the interruption state; the magnitude of the current detected by the first current sensor 34 is equal to or greater than the predetermined value, and the direction of the current is the positive direction; the magnitude of the current detected by the second current sensor 36 is equal to or greater than the predetermined value, and the direction of the current is the positive direction; the magnitude of the current detected by the third current sensor 42 is equal to or greater than the predetermined value, and the direction of the current is the positive direction; and the magnitude of the current detected by the fourth current sensor 44 is less than the predetermined value.

Figure 9:
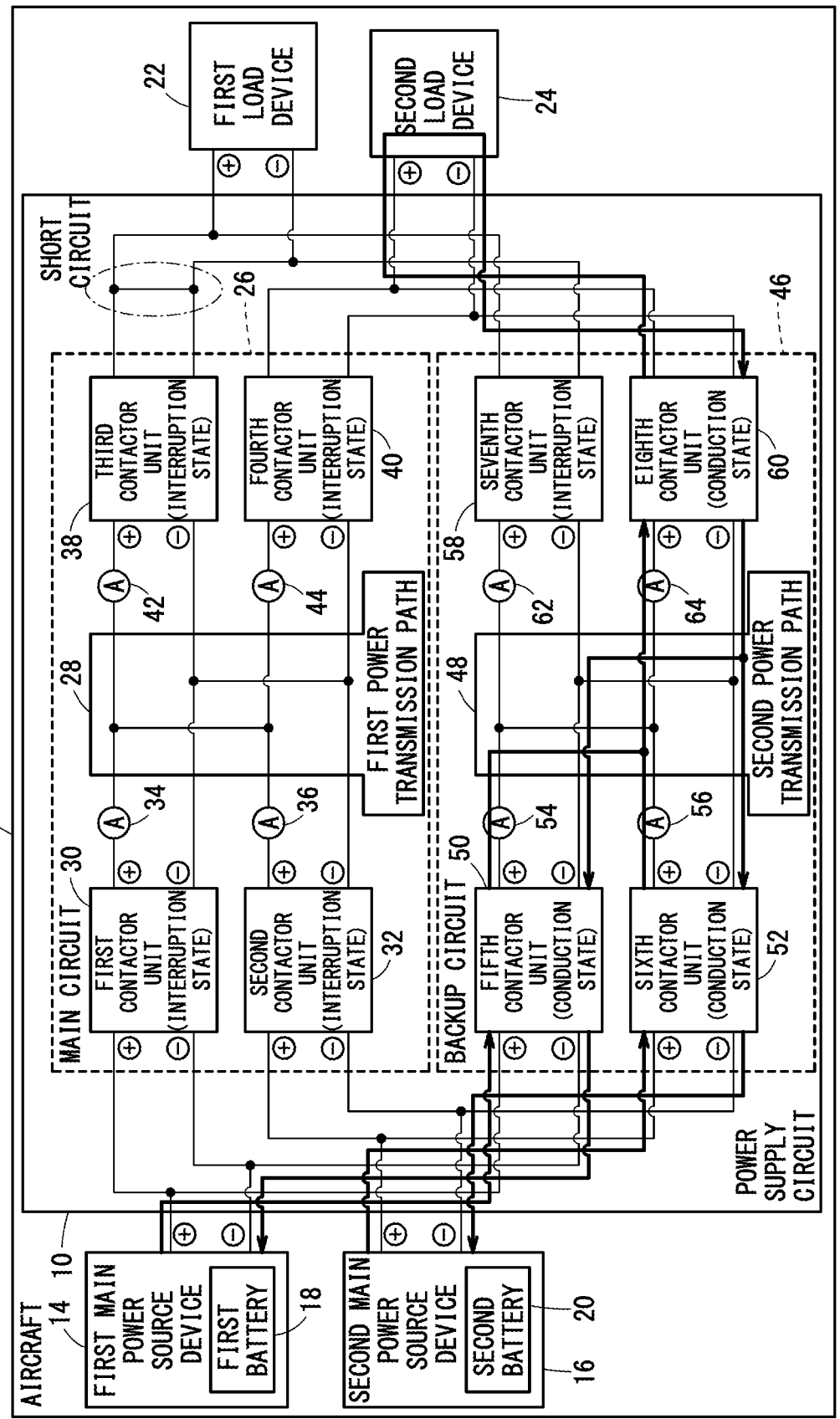
FIG. 9 is a diagram showing the flow of current in the power supply circuit.

FIG. 9 is a diagram showing the flow of current in the power supply circuit 10. In FIG. 9, thick arrows indicate the flow of current in the power supply circuit 10.

When it is determined that a short circuit has occurred between the first load device 22 and the third contactor unit 38, the control unit 66 performs control as follows. As shown in FIG. 9, the control unit 66 brings the first contactor unit 30, the second contactor unit 32, the third contactor unit 38, and the fourth contactor unit 40 of the main circuit 26 and the seventh contactor unit 58 of the backup circuit 46 into the interruption state. Further, the control unit 66 brings the fifth contactor unit 50, the sixth contactor unit 52, and the eighth contactor unit 60 of the backup circuit 46 into the conduction state.

When the seventh contactor unit 58 is brought into the conduction state, the second power transmission path 48 is connected to the location where the short circuit has occurred. In this state, when the fifth contactor unit 50 and the sixth contactor unit 52 of the backup circuit 46 are brought into the conduction state, an overcurrent flows into each of the first main power source device 14 and the second main power source device 16. As shown in FIG. 9, by bringing the seventh contactor unit 58 into the interruption state, the first main power source device 14 and the second main power source device 16 can be disconnected from the location where the short circuit has occurred.

The electric power output from each of the first main power source device 14 and the second main power source device 16 is supplied to the second load device 24 via the second power transmission path 48. The second load device 24 is driven by the electric power supplied from the first main power source device 14 and the second main power source device 16.

Advantageous Effects

In the aircraft 12, it is preferable to avoid losing thrust during flight, even temporarily. Even when an abnormality such as a short circuit occurs in the power supply circuit 10, it is required to continuously supply electric power from at least some of the main power source devices to at least some of the load devices. In order to satisfy this requirement, it is necessary to control the conduction state and the interruption state of each contactor unit in the power supply circuit 10 according to the location where an abnormality has occurred. Therefore, it is necessary to specify the location where the abnormality has occurred in the power supply circuit 10.

In the power supply circuit 10 of the present embodiment, the control unit 66 specifies the location where the abnormality has occurred, based on the current detected by each of the first current sensor 34, the second current sensor 36, the third current sensor 42, and the fourth current sensor 44. As a result, it is possible for the power supply circuit 10 of the present embodiment to specify the location where the abnormality has occurred in the power supply circuit 10.

In the power supply circuit 10 of the present embodiment, when all of the following conditions are satisfied, the control unit 66 determines that a short circuit has occurred between the first main power source device 14 and the first contactor unit 30.

The conditions are the following six conditions: the first contactor unit 30, the second contactor unit 32, the third contactor unit 38, and the fourth contactor unit 40 of the main circuit 26 are in the conduction state; the fifth contactor unit 50, the sixth contactor unit 52, the seventh contactor unit 58, and the eighth contactor unit 60 of the backup circuit 46 are in the interruption state; the magnitude of the current detected by the first current sensor 34 is equal to or greater than the predetermined value, and the direction of the current is the negative direction; the magnitude of the current detected by the second current sensor 36 is equal to or greater than the predetermined value, and the direction of the current is the positive direction; the magnitude of the current detected by the third current sensor 42 is less than the predetermined value; and the magnitude of the current detected by the fourth current sensor 44 is less than the predetermined value. As a result, it is possible for the power supply circuit 10 of the present embodiment to specify the location where the abnormality has occurred in the power supply circuit 10.

In the power supply circuit 10 of the present embodiment, when all of the following conditions are satisfied, the control unit 66 determines that a short circuit has occurred in the first power transmission path 28.

The conditions are the following six conditions: the first contactor unit 30, the second contactor unit 32, the third contactor unit 38, and the fourth contactor unit 40 of the main circuit 26 are in the conduction state; the fifth contactor unit 50, the sixth contactor unit 52, the seventh contactor unit 58, and the eighth contactor unit 60 of the backup circuit 46 are in the interruption state; the magnitude of the current detected by the first current sensor 34 is equal to or greater than the predetermined value, and the direction of the current is the positive direction; the magnitude of the current detected by the second current sensor 36 is equal to or greater than the predetermined value, and the direction of the current is the positive direction; the magnitude of the current detected by the third current sensor 42 is less than the predetermined value; and the magnitude of the current detected by the fourth current sensor 44 is less than the predetermined value. As a result, it is possible for the power supply circuit 10 of the present embodiment to specify the location where the abnormality has occurred in the power supply circuit 10.

In the power supply circuit 10 of the present embodiment, when all of the following conditions are satisfied, the control unit 66 determines that a short circuit has occurred between the first load device 22 and the third contactor unit 38.

The conditions are the following six conditions: the first contactor unit 30, the second contactor unit 32, the third contactor unit 38, and the fourth contactor unit 40 of the main circuit 26 are in the conduction state; the fifth contactor unit 50, the sixth contactor unit 52, the seventh contactor unit 58, and the eighth contactor unit 60 of the backup circuit 46 are in the interruption state; the magnitude of the current detected by the first current sensor 34 is equal to or greater than the predetermined value, and the direction of the current is the positive direction; the magnitude of the current detected by the second current sensor 36 is equal to or greater than the predetermined value, and the direction of the current is the positive direction; the magnitude of the current detected by the third current sensor 42 is equal to or greater than the predetermined value, and the direction of the current is the positive direction; and the magnitude of the current detected by the fourth current sensor 44 is less than the predetermined value.

As a result, it is possible for the power supply circuit 10 of the present embodiment to specify the location where the abnormality has occurred in the power supply circuit 10.

In the power supply circuit 10 of the present embodiment, the control unit 66 brings each of the fifth contactor unit 50, the sixth contactor unit 52, the seventh contactor unit 58, and the eighth contactor unit 60 into the conduction state or the interruption state based on the result of determination regarding the location where the abnormality has occurred.

Thus, electric power can be supplied from at least one of the first main power source device 14 or the second main power source device 16 to at least one of the first load device 22 or the second load device 24 via the second power transmission path 48. As a result, at least one of the first load device 22 or the second load device 24 can continue to be driven.

In the power supply circuit 10 of the present embodiment, when it is determined that an abnormality has occurred between the first main power source device 14 and the first contactor unit 30, the control unit 66 brings the first contactor unit 30, the second contactor unit 32, the third contactor unit 38, the fourth contactor unit 40, and the fifth contactor unit 50 into the interruption state. Further, the control unit 66 brings the sixth contactor unit 52, the seventh contactor unit 58, and the eighth contactor unit 60 into the conduction state.

Thus, even when an abnormality has occurred between the first main power source device 14 and the first contactor unit 30, electric power can be supplied from the second main power source device 16 to the first load device 22 and the second load device 24. As a result, the first load device 22 and the second load device 24 can continue to be driven.

In the power supply circuit 10 of the present embodiment, when it is determined that an abnormality has occurred in the first power transmission path 28, the control unit 66 brings the first contactor unit 30, the second contactor unit 32, the third contactor unit 38, and the fourth contactor unit 40 into the interruption state. Further, the control unit 66 brings the fifth contactor unit 50, the sixth contactor unit 52, the seventh contactor unit 58, and the eighth contactor unit 60 into the conduction state.

Thus, even when an abnormality has occurred in the first power transmission path 28, electric power can be supplied from each of the first main power source device 14 and the second main power source device 16 to the first load device 22 and the second load device 24. As a result, the first load device 22 and the second load device 24 can continue to be driven.

In the power supply circuit 10 of the present embodiment, when it is determined that an abnormality has occurred between the first load device 22 and the third contactor unit 38, the control unit 66 brings the first contactor unit 30, the second contactor unit 32, the third contactor unit 38, the fourth contactor unit 40, and the seventh contactor unit 58 into the interruption state. Further, the control unit brings the fifth contactor unit 50, the sixth contactor unit 52, and the eighth contactor unit 60 into the conduction state.

Thus, even when an abnormality has occurred between the first load device 22 and the third contactor unit 38, electric power can be supplied from each of the first main power source device 14 and the second main power source device 16 to the second load device 24. As a result, the second load device 24 can continue to be driven.

Note that the present invention is not limited to the above disclosure, and various modifications are possible without departing from the essence and gist of the present invention.

In the first embodiment, the power supply circuit 10 is mounted on the aircraft 12. However, the power supply circuit 10 may be mounted not only on the aircraft 12 but also on various moving objects such as ships, automobiles, and trains.

In the first embodiment, the power supply circuit 10 supplies electric power from the two main power source devices, namely, the first main power source device 14 and the second main power source device 16 to the two load devices, namely, the first load device 22 and the second load device 24. However, the power supply circuit 10 may supply electric power from three or more main power source devices to three or more load devices. The number of main power source devices and the number of load devices may be different from each other.

The first main power source device 14 may include a plurality of the first batteries 18. The second main power source device 16 may include a plurality of the second batteries 20. Each of the first load device 22 and the second load device 24 may be formed of a plurality of load devices.

[Invention Obtained from Embodiment]

The invention that can be grasped from the above embodiment will be described below.

According to the present invention, provided is the power supply circuit (10) of the moving object (12), the power supply circuit including: the first power transmission path (28) configured to transmit electric power from one first power source (14) and at least one second power source (16) to one first load (22) and at least one second load (24); the first contactor unit (30) configured to switch between the conduction state in which electricity flows and the interruption state in which flow of electricity is interrupted, between the first power source and the first power transmission path; at least one second contactor unit (32) configured to switch between the conduction state and the interruption state, between the at least one second power source and the first power transmission path; the third contactor unit (38) configured to switch between the conduction state and the interruption state, between the first load and the first power transmission path; at least one fourth contactor unit (40) configured to switch between the conduction state and the interruption state, between the at least one second load and the first power transmission path; the first current sensor (34) configured to detect a current between the first contactor unit and the first power transmission path; at least one second current sensor (36) configured to detect a current between the at least one second contactor unit and the first power transmission path; the third current sensor (42) configured to detect a current between the third contactor unit and the first power transmission path; and at least one fourth current sensor (44) configured to detect a current between the at least one fourth contactor unit and the first power transmission path, wherein when the first contactor unit, the at least one second contactor unit, the third contactor unit, and the at least one fourth contactor unit are in the conduction state, determination is made as to whether or not an abnormality has occurred in the first power transmission path, whether or not an abnormality has occurred between the first power source and the first contactor unit, and whether or not an abnormality has occurred between the first load and the third contactor unit, based on the current detected by each of the first current sensor, the at least one second current sensor, the third current sensor, and the at least one fourth current sensor. As a result, it is possible for the power supply circuit to specify the location where the abnormality has occurred in the power supply circuit.

In the above-described power supply circuit of the moving object, in a case where: the magnitude of the current detected by the first current sensor is equal to or greater than the predetermined value and the direction of the current detected by the first current sensor is not the predetermined direction; the magnitude of the current detected by the at least one second current sensor is equal to or greater than the predetermined value and the direction of the current detected by the at least one second current sensor is the predetermined direction; the magnitude of the current detected by the third current sensor is less than the predetermined value; and the magnitude of the current detected by the at least one fourth current sensor is less than the predetermined value, it may be determined that the abnormality has occurred between the first power source and the first contactor unit. As a result, it is possible for the power supply circuit to specify the location where the abnormality has occurred in the power supply circuit.

In the above-described power supply circuit of the moving object, in a case where: the magnitude of the current detected by the first current sensor is equal to or greater than the predetermined value and the direction of the current detected by the first current sensor is the predetermined direction; the magnitude of the current detected by the at least one second current sensor is equal to or greater than the predetermined value and the direction of the current detected by the at least one second current sensor is the predetermined direction; the magnitude of the current detected by the third current sensor is less than the predetermined value; and the magnitude of the current detected by the at least one fourth current sensor is less than the predetermined value, it may be determined that the abnormality has occurred in the first power transmission path. As a result, it is possible for the power supply circuit to specify the location where the abnormality has occurred in the power supply circuit.

In the above-described power supply circuit of the moving object, in a case where: the magnitude of the current detected by the first current sensor is equal to or greater than the predetermined value and the direction of the current detected by the first current sensor is the predetermined direction; the magnitude of the current detected by the at least one second current sensor is equal to or greater than the predetermined value and the direction of the current detected by the at least one second current sensor is the predetermined direction; the magnitude of the current detected by the third current sensor is equal to or greater than the predetermined value and the direction of the current detected by the third current sensor is the predetermined direction; and the magnitude of the current detected by the at least one fourth current sensor is less than the predetermined value, it may be determined that the abnormality has occurred between the first load and the third contactor unit. As a result, it is possible for the power supply circuit to specify the location where the abnormality has occurred in the power supply circuit.

The above-described power supply circuit of the moving object may further include: the second power transmission path (48) provided in parallel with the first power transmission path and configured to transmit electric power from the one first power source and the at least one second power source to the one first load and the at least one second load; the fifth contactor unit (50) configured to switch between the conduction state and the interruption state, between the first power source and the second power transmission path; at least one sixth contactor unit (52) configured to switch between the conduction state and the interruption state, between the at least one second power source and the second power transmission path; the seventh contactor unit (58) configured to switch between the conduction state and the interruption state, between the first load and the second power transmission path; and at least one eighth contactor unit (60) configured to switch between the conduction state and the interruption state, between the at least one second load and the second power transmission path, wherein each of the fifth contactor unit, the at least one sixth contactor unit, the seventh contactor unit, and the at least one eighth contactor unit may be brought into the conduction state or the interruption state based on the result of the determination as to whether or not the abnormality has occurred in the first power transmission path, whether or not the abnormality has occurred between the first power source and the first contactor unit, and whether or not the abnormality has occurred between the first load and the third contactor unit. Accordingly, electric power can be supplied from at least one of the first main power source device or the at least one second main power source device to at least one of the first load device or the at least one second load device via the second power transmission path. As a result, at least one of the first load device or the at least one second load device can continue to be driven.

In the above-described power supply circuit of the moving object, the first contactor unit, the at least one second contactor unit, the third contactor unit, the at least one fourth contactor unit, and the fifth contactor unit may be brought into the interruption state, and the at least one sixth contactor unit, the seventh contactor unit, and the at least one eighth contactor unit may be brought into the conduction state, in a case where it is determined that the abnormality has occurred between the first power source and the first contactor unit. Accordingly, even when an abnormality has occurred between the first main power source device and the first contactor unit, electric power can be supplied from the at least one second main power source device to the first load device and the at least one second load device. As a result, the first load device and the at least one second load device can continue to be driven.

In the above-described power supply circuit of the moving object, the first contactor unit, the at least one second contactor unit, the third contactor unit, and the at least one fourth contactor unit may be brought into the interruption state, and the fifth contactor unit, the at least one sixth contactor unit, the seventh contactor unit, and the at least one eighth contactor unit may be brought into the conduction state, in a case where it is determined that the abnormality has occurred in the first power transmission path. Accordingly, even when an abnormality has occurred in the first power transmission path, electric power can be supplied from each of the first main power source device and the at least one second main power source device to the first load device and the at least one second load device. As a result, the first load device and the at least one second load device can continue to be driven.

In the above-described power supply circuit of the moving object, the first contactor unit, the at least one second contactor unit, the third contactor unit, the at least one fourth contactor unit, and the seventh contactor unit may be brought into the interruption state, and the fifth contactor unit, the at least one sixth contactor unit, and the at least one eighth contactor unit may be brought into the conduction state, in a case where it is determined that the abnormality has occurred between the first load and the third contactor unit. Accordingly, even when an abnormality has occurred between the first load device and the third contactor unit, electric power can be supplied from each of the first main power source device and the at least one second main power source device to the second load device. As a result, the second load device can continue to be driven.

The invention claimed is:

1. A power supply circuit of a moving object, the power supply circuit comprising:
    a first power transmission path configured to transmit electric power from one first power source and at least one second power source to one first load and at least one second load;
    a first contactor unit configured to switch between a conduction state in which electricity flows and an interruption state in which flow of electricity is interrupted, between the first power source and the first power transmission path;
    at least one second contactor unit configured to switch between the conduction state and the interruption state, between the at least one second power source and the first power transmission path;
    a third contactor unit configured to switch between the conduction state and the interruption state, between the first load and the first power transmission path;
    at least one fourth contactor unit configured to switch between the conduction state and the interruption state, between the at least one second load and the first power transmission path;
    a first current sensor configured to detect a current between the first contactor unit and the first power transmission path;
    at least one second current sensor configured to detect a current between the at least one second contactor unit and the first power transmission path;
    a third current sensor configured to detect a current between the third contactor unit and the first power transmission path;
    at least one fourth current sensor configured to detect a current between the at least one fourth contactor unit and the first power transmission path;
    a second power transmission path provided in parallel with the first power transmission path and configured to transmit electric power from the one first power source and the at least one second power source to the one first load and the at least one second load;
    a fifth contactor unit configured to switch between the conduction state and the interruption state, between the first power source and the second power transmission path;
    at least one sixth contactor unit configured to switch between the conduction state and the interruption state, between the at least one second power source and the second power transmission path;
    a seventh contactor unit configured to switch between the conduction state and the interruption state, between the first load and the second power transmission path; and
    at least one eighth contactor unit configured to switch between the conduction state and the interruption state, between the at least one second load and the second power transmission path,
    wherein when the first contactor unit, the at least one second contactor unit, the third contactor unit, and the at least one fourth contactor unit are in the conduction state, determination is made as to whether or not an abnormality has occurred in the first power transmission path, whether or not an abnormality has occurred between the first power source and the first contactor unit, and whether or not an abnormality has occurred between the first load and the third contactor unit, based on the current detected by each of the first current sensor, the at least one second current sensor, the third current sensor, and the at least one fourth current sensor, and
    wherein each of the fifth contactor unit, the at least one sixth contactor unit, the seventh contactor unit, and the at least one eighth contactor unit is brought into the conduction state or the interruption state based on a result of the determination as to whether or not the abnormality has occurred in the first power transmission path, whether or not the abnormality has occurred between the first power source and the first contactor unit, and whether or not the abnormality has occurred between the first load and the third contactor unit.

2. The power supply circuit of the moving object according to claim 1, wherein
    in a case where: a magnitude of the current detected by the first current sensor is equal to or greater than a predetermined value and a direction of the current detected by the first current sensor is not a predetermined direction; a magnitude of the current detected by the at least one second current sensor is equal to or greater than the predetermined value and a direction of the current detected by the at least one second current sensor is the predetermined direction; a magnitude of the current detected by the third current sensor is less than the predetermined value; and a magnitude of the current detected by the at least one fourth current sensor is less than the predetermined value, it is determined that the abnormality has occurred between the first power source and the first contactor unit.

3. The power supply circuit of the moving object according to claim 1, wherein
    in a case where: a magnitude of the current detected by the first current sensor is equal to or greater than a predetermined value and a direction of the current detected by the first current sensor is a predetermined direction; a magnitude of the current detected by the at least one second current sensor is equal to or greater than the predetermined value and a direction of the current detected by the at least one second current sensor is the predetermined direction; a magnitude of the current detected by the third current sensor is less than the predetermined value; and a magnitude of the current detected by the at least one fourth current sensor is less than the predetermined value, it is determined that the abnormality has occurred in the first power transmission path.

4. The power supply circuit of the moving object according to claim 1, wherein in a case where: a magnitude of the current detected by the first current sensor is equal to or greater than a predetermined value and a direction of the current detected by the first current sensor is a predetermined direction; a magnitude of the current detected by the at least one second current sensor is equal to or greater than the predetermined value and a direction of the current detected by the at least one second current sensor is the predetermined direction; a magnitude of the current detected by the third current sensor is equal to or greater than the predetermined value and a direction of the current detected by the third current sensor is the predetermined direction; and a magnitude of the current detected by the at least one fourth current sensor is less than the predetermined value, it is determined that the abnormality has occurred between the first load and the third contactor unit.

5. The power supply circuit of the moving object according to claim 1, wherein
the first contactor unit, the at least one second contactor unit, the third contactor unit, the at least one fourth contactor unit, and the fifth contactor unit are brought into the interruption state, and the at least one sixth contactor unit, the seventh contactor unit, and the at least one eighth contactor unit are brought into the conduction state, in a case where it is determined that the abnormality has occurred between the first power source and the first contactor unit.

6. The power supply circuit of the moving object according to claim 1, wherein
the first contactor unit, the at least one second contactor unit, the third contactor unit, and the at least one fourth contactor unit are brought into the interruption state, and the fifth contactor unit, the at least one sixth contactor unit, the seventh contactor unit, and the at least one eighth contactor unit are brought into the conduction state, in a case where it is determined that the abnormality has occurred in the first power transmission path.

7. The power supply circuit of the moving object according to claim 1, wherein
the first contactor unit, the at least one second contactor unit, the third contactor unit, the at least one fourth contactor unit, and the seventh contactor unit are brought into the interruption state, and the fifth contactor unit, the at least one sixth contactor unit, and the at least one eighth contactor unit are brought into the conduction state, in a case where it is determined that the abnormality has occurred between the first load and the third contactor unit.

* * * * *